(12) United States Patent
Shaw

(10) Patent No.: US 6,209,560 B1
(45) Date of Patent: *Apr. 3, 2001

(54) PRESSURE TESTING ASSEMBLY AND TESTING METHOD FOR PROPANE TANK SYSTEMS

(75) Inventor: Jimmie Bryant Shaw, Carrollton, MS (US)

(73) Assignee: Presto-Tap, LLC, Cordova, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/296,245

(22) Filed: Apr. 22, 1999

Related U.S. Application Data (63) Continuation-in-part of application No. 09/105,264, filed on Jun. 26, 1998, now Pat. No. 5,992,438, which is a continuation-in-part of application No. 08/603,215, filed on Feb. 20, 1996, now Pat. No. 5,787,916.

(51) Int. Cl.$^7$ .............................. F16L 55/18; F16K 37/00
(52) U.S. Cl. .............................. 137/14; 137/15; 137/557; 137/883; 73/40.5; 73/756; 251/146
(58) Field of Search .............................. 251/146; 137/14, 137/15, 557, 883; 73/40.5, 756

(56) References Cited

U.S. PATENT DOCUMENTS

| | | | |
|---|---|---|---|
| 483,106 | * | 9/1892 | Dixon ................................... 137/557 |
| 632,808 | * | 9/1899 | Dunlap .................................. 137/557 |
| 1,666,283 | * | 4/1928 | Farley ................................... 137/557 |
| 2,881,011 | * | 4/1959 | Coughlin ............................... 137/557 |
| 2,923,312 | * | 2/1960 | Wagner ................................. 137/320 |
| 3,448,758 | * | 6/1969 | Mullins ................................. 251/146 |
| 3,517,693 | * | 6/1970 | Dretz ..................................... 137/557 |
| 3,853,144 | * | 12/1974 | Whelan .................................. 137/883 |
| 3,891,002 | * | 6/1975 | Mower et al. ......................... 137/557 |
| 4,332,273 | * | 6/1982 | Boyce ................................... 137/222 |
| 4,338,793 | * | 7/1982 | O'Hern, Jr. ............................. 62/292 |
| 4,450,721 | | 5/1984 | Gaunt et al. . |
| 4,702,754 | * | 10/1987 | Blocker ................................. 137/227 |
| 4,944,292 | * | 7/1990 | Gaeke et al. .......................... 137/883 |
| 4,976,134 | * | 12/1990 | Potvin ................................... 73/1.16 |
| 5,183,078 | * | 2/1993 | Sorrell ................................... 73/756 |
| 5,404,905 | * | 4/1995 | Lauria ................................... 137/557 |
| 5,787,916 | * | 8/1998 | Shaw ..................................... 137/14 |
| 5,992,438 | * | 11/1999 | Shaw ..................................... 137/14 |

OTHER PUBLICATIONS

1. Product brochure for G–430 Leak Test Fitting; from Marshall Brass (Div. of S.H. Leggitt Co.); Marshall, MI. 1996.
2. Product brochure for Flo–Lek Meter; by Koch & Associates, Edmond, Oklahoma. 1998.
3. Product brochure for REGO gauges and valves. 1998.

\* cited by examiner

*Primary Examiner*—A. Michael Chambers
(74) *Attorney, Agent, or Firm*—Larson & Taylor, PLC

(57) ABSTRACT

A method and assembly (kit) are provided for use by propane tank service personnel to detect escaping gas in propane tank systems. The standard connection between the regulator and tank service valve is replaced with a permanent valve assembly including a main connection between the regulator and valve and a valve unit disposed in a branch connection of the valve assembly. A separate pressure gauge is individually assigned to tank service personnel and adapted to be carried by such personnel in testing the pressure in the propane tank. The pressure gauge is affixed, e.g., through a hose, to a valve unit connector including an actuator, i.e., a valve stem operator, for actuating the valve unit. When the pressure gauge is connected to the valve unit, the latter is actuated to provide an immediate reading of the tank pressure. A determination is made from this reading whether the tank is out of gas, and if the tank is out of gas, the service valve is turned on, gas introduced, the service valve turned off and a further pressure check made to determine whether gas is leaking. In one embodiment, the valve unit comprises a saddle valve directly connected to the main connection over a drilled hole in the latter.

16 Claims, 6 Drawing Sheets

PRESSURE TESTING ASSEMBLY AND TESTING METHOD FOR PROPANE TANK SYSTEMS

CROSS REFERENCE TO RELATED APPLICATION

This application is a continuation-in-part of U.S. Ser. No. 09/105,264 filed on Jun. 26, 1998, now U.S. Pat. No. 5,992,438 issued Nov. 30, 1999, which, in turn, is a continuation-in-part of U.S. Ser. No. 08/603,215, filed on Feb. 20, 1996, now U.S. Pat. No. 5,787,916.

FIELD OF THE INVENTION

The present invention relates to propane tank systems and, more particularly, to a testing assembly and testing method for enabling repair personnel such as a driver-serviceman to readily check for leakage of propane gas from such a system.

BACKGROUND OF THE INVENTION

Propane gas leaks can obviously cause serious problems. For example, fires resulting from such leaks can cause both property damage and personal injury including, in extreme cases, death. Thus, a very real need exists for an approach in testing for such leaks that will effectively protect the homeowner-users of propane gas. Such protection would also be of substantial benefit to the companies that serve such homeowner-users particularly in the area of reducing the spiraling costs of lawsuits involving the leakage of gas into the home of a customer from the propane system. This leakage is often from appliances that have inadvertently been left on at the time of a gas outage in the propane tank. In any event, whatever the cause of such leakage, it is obviously very important to be able to readily determine when there is leakage from the system.

There are strict rules associated with the assembly and servicing of propane systems. The current rules are set out in NFPA Pamphlet 58. Considering the rules that bear on the issues involved with the present invention, NFPA Pamphlet 58, Section 3-2.10 states that "After assembly, piping systems (including hose) shall be tested and proven free of leaks at not less than operating pressure." Section 4.2.1 states that "Before gas is introduced into a system after being shut off, the entire system shall be inspected to determine that there are no open fittings or ends and all manual valves at outlets on equipment are closed and all unused valves at outlets are closed and plugged or capped." Section 4.2.2 states "Immediately after turning on the gas the piping system shall be tested to ascertain that no gas is escaping." In addition, section 4.3.4 describes the proves for purging (emptying of air from) a system that has been opened and states "After the piping has been placed in operation, all equipment shall be purged and then placed in operation as necessary."

Section 4.1.4 of this pamphlet describes the methods of pressure testing and states as follows: "(a) Test pressure shall be measured with a manometer or with a pressure measuring device designed and calibrated to read, record, or indicate a pressure loss due to leakage during the pressure test period. The source of pressure shall be isolated before the pressure tests are made. (b) The test pressure to be used shall be no less than 1½ time the proposed maximum working pressure, but not less than 3 psig, irrespective of design pressure. Where the pressure exceeds 125 psig, the test pressure shall not exceed a value that produces a hoop stress in the piping greater than 50 percent of the specified minimum yield strength of the pipe. (c) Systems for undiluted liquefied petroleum gases shall withstand the pressure test in accordance with (b) above, or, for single-staged systems operating at a pressure of ½ psig or less, shall withstand a test pressure of 9.0±½ inch water column for a period of not less than 10 minutes without showing any drop in pressure. If the source of pressure for this test is a liquefied petroleum gas container, the container service valve shall be checked for positive shutoff with leak detector solution prior to the test, or shall be disconnected from the system during the test. (d) Test duration shall be not less than ½ hour for each 500 cubic feet of pipe volume or fraction thereof. When testing a system having a volume less than 10 cubic feet or a system in a single-family dwelling, the test duration shall be permitted to be reduced to 10 minutes. For a piping system having a volume of more than 24,000 cubic feet, the duration of the test shall not be required to exceed 24 hours." Finally, Section 4.1.2 (exception) states that "Fuel gas shall be permitted to be used in piping systems operating at pressures of 0.5 psig."

At present, there is no way for a driver-salesman or a service person, hereinafter referred to for convenience as a repairman or repair personnel, to check for leakage as described above without interrupting the gas piping, a process that is very time consuming. Further, this process introduces unwanted air into the system and thus requires such air to be purged.

There are, of course, many systems which use permanent valves and gauges for determining and/or controlling the pressure in the system. Reference is made in this regard to U.S. Pat. Nos. 2,923,312 (Wagner), 4,332,273 (Boyce) and 4,338,793 (O'Hern, Jr.) relating to refrigeration systems and to U.S. Pat. No. 4,702,754 (Blocker) relating to natural gas or propane delivery systems and U.S. Pat. No. 4,183,078 (Sorrell) relating to a combination shut-off and test-injection valve. Briefly considering some of these patents, the Wagner patent discloses a valve tool for charging and discharging refrigeration systems including a tee-adapter for testing gas pressures. The Boyce patent disclosed a leak-proof connector including a valve of the Schrader (or Schroeder) type while the O'Hern, Jr. patent discloses an adapter for a refrigeration system which also uses a normally closed Schrader valve. The Blocker patent discloses a test adapter which permits pressure tests to be carried out on delivery systems for fuel gas, i.e., propane or natural gas.

SUMMARY OF THE INVENTION

According to the present invention, an assembly kit and method are provided which permit service or repair personnel to check a propane system for leaks at the time of introduction of propane into the system and which eliminates the need for the purging described above after the test. The service person is also assisted in ascertaining whether the system is actually out of gas, requiring interruption of service, in spite of the reading(s) provided by the tank gauge(s) since such gauges may be inoperative or may be giving false readings.

In accordance with a first aspect of the invention, a method is provided for use by propane tank service personnel in detecting escaping gas in propane tank systems including a regulator and a tank service valve connected together by a standard connector, the method comprising the steps of: replacing the standard connector with a permanent valve and connector assembly including first and second end connections and a branch connection portion, a valve unit disposed in said branch connection portion and including a valve stem actuable to open said valve unit, the replacing step including connecting said first and second end connections to the tank service valve and the regulator, respectively; and using a separate pressure gauge assembly individually assigned to tank service personnel and adapted to be carried by said personnel for testing the pressure in the propane tank, said pressure gauge assembly including a pressure gauge; a valve assembly connector including means for actuating the valve unit when the valve assembly connector is connected to the valve assembly, said testing of pressure comprising connecting the valve assembly connector of the pressure gauge assembly to the branch connection portion of the valve assembly to actuate the valve unit and thus provide an immediate reading of the tank pressure by said gauge, using the reading of tank pressure in determining whether the tank is out of propane gas, and thereafter taking one or the other of the following two steps depending on the determining step: if the tank is determined to not be out of propane gas, introducing gas into the tank as needed; and if the tank is determined to be out of propane gas, turning the tank service valve off, pressurizing the tank, turning the service valve on, introducing gas into the system to pressurize the system, thereafter turning the tank service valve back off again so as to isolate the gas introduced into the tank, and reading the gauge pressure to determine whether gas is escaping from the propane tank system. It will be appreciated that because each tank service person carries his or her own gauge assembly, a separate gauge is not necessary for each propane tank system and one gauge assembly only is needed by each service person.

In a preferred, advantageous embodiment, the gauge includes an indicating needle and further comprises a pressure scale and an ambient temperature scale calibrated relative to said pressure scale so that the position of the needle that provides a reading of gauge pressure on the pressure scale also provides a reading of the corresponding minimum ambient temperature on the ambient temperature scale, and the determining step for determining whether the tank is out of propane gas includes determining the actual ambient temperature and comparing the actual ambient temperature with the reading of said corresponding minimum ambient temperature.

According to a second aspect of the invention, a kit is provided for use in a propane tank system for enabling detection of escaping gas by tank repair personnel, the tank system including a standard connector connecting a regulator to a tank service valve, and the kit comprising: a valve and connector assembly for connection between the regulator and the service valve in place of the standard connector, the valve and connector assembly comprising a connector including end connections for connection to the regulator and the service valve, respectively, a main connector portion between the said end connectors, and a branch connector portion connected at one end thereof to the main connection portion, a valve unit disposed in the branch connector portion and including a valve stem actuable to open a connection to the main connector portion; and a separate pressure gauge assembly adapted to be carried by tank repair personnel and including a pressure gauge, and a mounting means, connected to the pressure gauge, for providing connection of the pressure gauge to the branch connector portion of the valve assembly, and for, when connected to said branch connector portion, providing actuation of the valve stem so that, in use with the tank service valve open, the pressure gauge provides a reading of the tank pressure and, in use with the system pressurized and the tank service valve closed, the gauge provides an indication of the presence of a leak or open line in the propane tank system.

The gauge preferably includes an indicating needle and further comprises includes a pressure scale and an ambient temperature scale calibrated relative to said pressure scale so that the position of the needle that provides a reading of gauge pressure on the pressure scale also provides a reading of the corresponding minimum ambient temperature on the ambient temperature scale.

The valve unit advantageously comprises a Schrader valve. Further, the means disposed at the other end of the hose of the gauge assembly preferably includes a finger pressure operated screw-on connector. The latter feature enables the gauge assembly to be connected to the system without the use of wrenches or the like.

Preferably, the main connector portion includes at least one flexible portion. Advantageously, the at least one flexible portion comprises a pigtail section.

In one preferred embodiment, the branch connector portion is welded to the main portion. Advantageously, the main connector portion includes a pigtail section and the branch connector portion is welded to the pigtail section.

In another preferred embodiment, the connector includes a straight pipe connector and one of the end connectors comprises left-hand threading on the straight pipe connector for connection to the service valve.

In yet a further embodiment, the branch connector portion includes a quick coupling valve unit and the mounting means of said pressure gauge assembly includes a cooperating quick coupling connector.

In accordance with yet another aspect of the invention, a kit is provided for use in a propane tank system for enabling detection of escaping gas by tank repair personnel, the tank system including a standard connector connecting a regulator to a tank service valve, and the kit comprising:

a valve and connector assembly for connection between the regulator and the service valve in place of the standard connector, the valve and connector assembly comprising a connector including end connections for connection to the regulator and the service valve, respectively, a main connector portion between the end connectors and including an outlet hole therein along its length, and a branch connector portion connected at one end thereof to the main connector portion and terminating in a free end, the branch connector portion comprising a saddle valve unit directly connected to the main connector portion over the outlet hole and including a valve stem actuable to open a connection from the connector to the free end of the branch connector portion, and a separate pressure gauge assembly adapted to be carried by tank repair personnel and including a pressure gauge, and mounting means, affixed to the pressure gauge, for providing connection of the pressure gauge to said free end of the branch connector portion of the valve assembly, and for, when connected to said free end of the branch connector portion, providing actuation of the valve stem so that, in use with the tank service valve open, the gauge provides a reading of the tank pressure and, in use with the system pressurized and the tank service valve closed, the gauge provides an indication of the presence of a leak or open line in the propane tank system.

Preferably, the saddle valve unit includes outwardly extending spaced legs which fit around the main connector portion and are welded or soldered to the main connector portion.

According to a still further aspect of the invention, a method is provided for use by propane tank service personnel in detecting escaping gas in a propane tank system including a regulator and a tank service valve connected together by a valve and connector assembly including first and second end connections connected to the tank service valve and the regulator, respectively, a branch connection portion, and a valve unit disposed in the branch connection portion and including a valve stem actuable to open the valve unit, the method comprising using a separate pressure gauge assembly individually assigned to tank service personnel and adapted to be carried by said personnel for testing the pressure in the propane tank, the pressure gauge assembly including a pressure gauge; a valve assembly connector including means for actuating the valve unit when the valve assembly connector is connected to the valve assembly, and the testing of pressure comprising connecting the valve assembly connector of the pressure gauge assembly to the branch connection portion of the valve and connector assembly to actuate the valve unit and thus provide an immediate reading of the tank pressure by said gauge, using the reading of tank pressure in determining whether the tank is out of propane gas, and thereafter taking one or the other of the following two steps depending on the determining step: if the tank is determined to not be out of propane gas, introducing gas into the tank as needed; and if the tank is determined to be out of propane gas, turning the tank service valve off, pressurizing the tank, turning the service valve on, introducing gas into the system to pressurize the system, thereafter turning the tank service valve back off again so as to isolate the gas introduced into the tank, and reading the gauge pressure to determine whether gas is escaping from the propane tank system.

Preferably, the valve and connector assembly includes a main connection portion between the first and second end connections, an outlet hole is drilled into the main connector portion at an intermediate location therealong, and the valve unit comprises a saddle valve affixed to the main connector portion over the outlet hole.

Other features and advantages of the invention will be set forth in, or apparent from, the following detailed description of the preferred embodiment of the invention.

DESCRIPTION OF THE PREFERRED EMBODIMENTS

Figure 1:
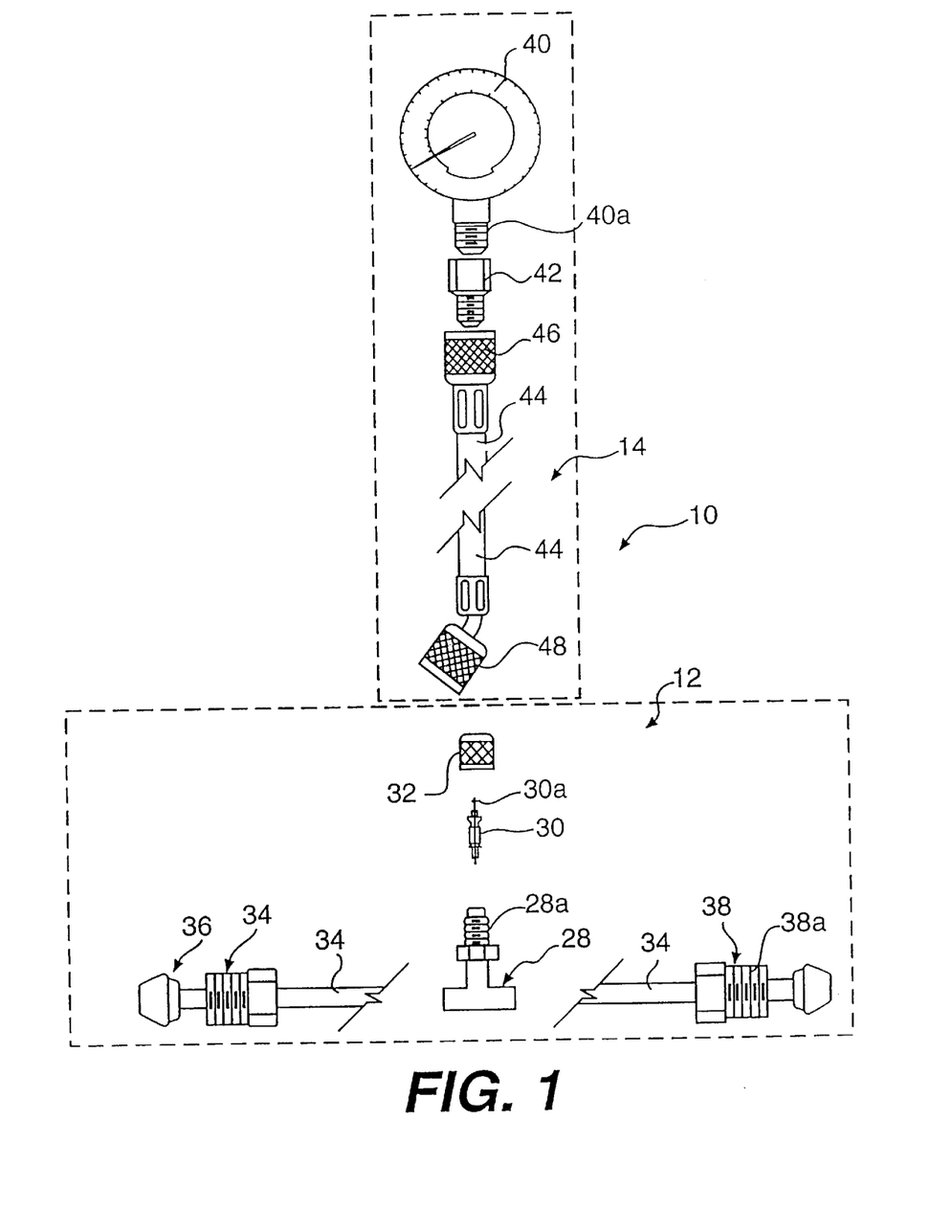
FIG. 1 is an exploded front elevational view of a pressure testing kit or assembly constructed in accordance with a preferred embodiment of the invention.

Referring to FIG. 1, there is shown an exploded front elevational view of the propane tank leakage detection kit or assembly of the invention. The overall assembly, which is generally denoted 10, basically comprises a valve assembly 12 which is adapted to be installed on the tank and a pressure gauge assembly 14 is carried by repair or service personnel and, as explained in more detail below, is adapted to be connected in line in the tank system and used in cooperation with valve assembly 12 to provide an indication or measurement of the gas pressure within the tank.

Figure 3:
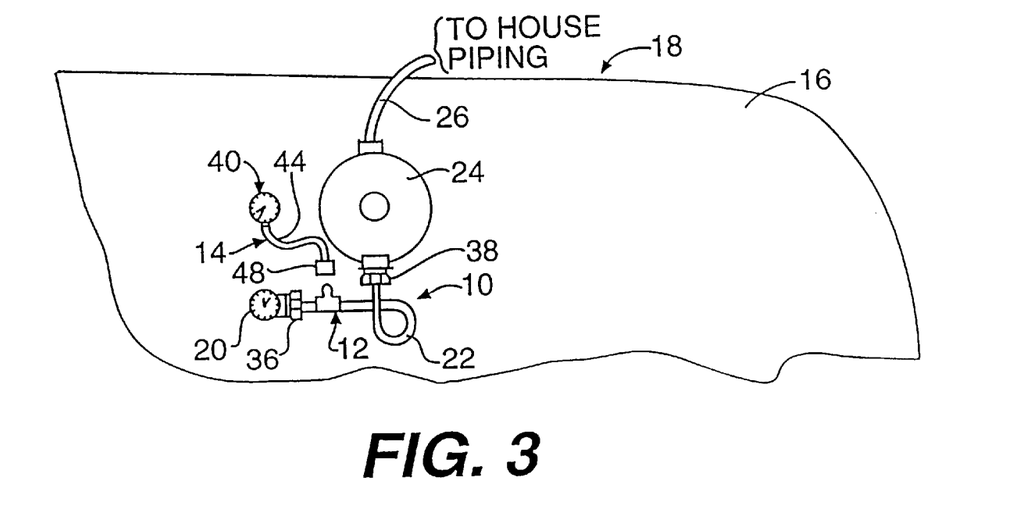
FIG. 3 is a front elevational view of the gauge of FIG. 1.

Before considering the two assemblies 12 and 14 in more detail, reference is made to FIG. 3 which shows the assembly 10 about to be used to measure the pressure with a propane tank 16 of a propane tank system generally denoted 18. The propane tank system 18 includes a tank valve 20 located at the top of tank 16 generally centrally thereof, a flexible "pigtail" connector 22 which connects tank valve 20 to a regulator 24 and an outlet connector 26 which connects regulator 24 to the house piping, i.e., the piping into the house at which the tank system 18 is used.

Figure 2:
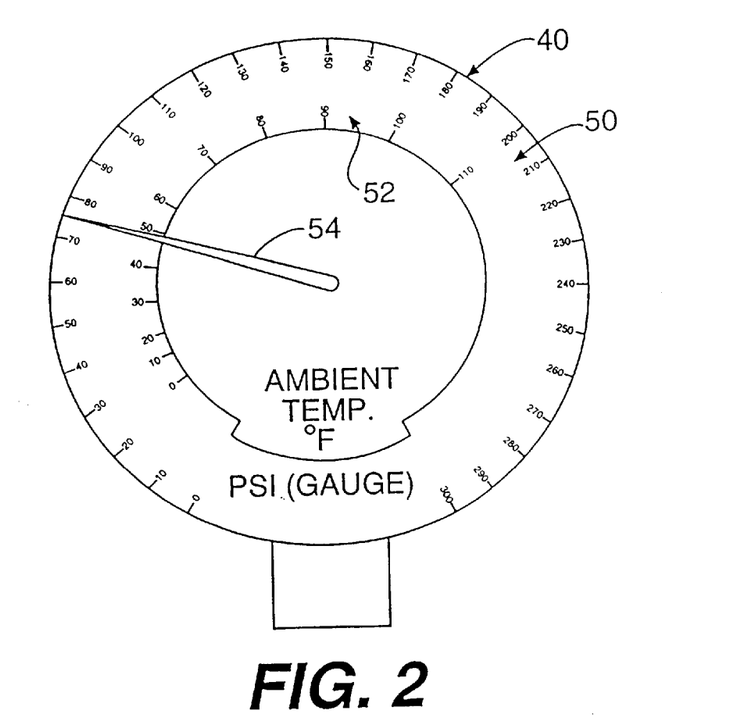
FIG. 2, is a top plan view of a propane tank incorporating the testing assembly of FIG. 1.

It will be understood that tank valve 20, regulator 24 and connector 26 are conventional, and that a conventional system would include a connection, typically in the form of a pigtail connector, between the tank valve and regulator. However, in accordance with a preferred embodiment of the present invention, the conventional connection between valve 20 and regulator 22 is replaced by a connector 22 which is constituted by or incorporates a valve assembly 12 corresponding to that shown in FIG. 1 and which cooperates with a pressure gauge assembly 14 which is shown in FIG. 2 and which also corresponds to that shown in FIG. 1.

Referring again to FIG. 1, valve assembly 12 includes a tee connector 28 which includes a central branch forming a male flare connection 28a adapted to receive therein a valve unit or valve 30. Valve 30 is preferably a conventional Schrader valve such as the valves which are conventionally used in refrigeration systems. Such a valve is described in, for example, in U.S. Pat. No. 4,338,793 to O'Hern, Jr. referred to above. The valve 30 includes a valve stem or operator 30a which controls opening and closing of the valve 30 in a conventional manner. A knurled valve cap 32 fits over the male connection 28a when the valve is not connected to gauge assembly 14. The base of tee connector 28 is fitted in line into a flexible connector 34 so that, with valve 30 closed, a direct or through connection is provided thereby between tank valve 20 and regulator 24. At opposite ends of flexible connector 34 are conventional end connections 36 and 38 including male unions 36a and 38a. It is to be understood that apart form connection therein of a valve unit therein the flexible connection 34 and end connections 36 and 38 are entirely conventional and themselves form no part of the invention. The elements are considered to be part of valve assembly 12 because, in accordance with a preferred embodiment of the invention, the entire existing standard or conventional connection between tank valve 20 and regulator 24 is replaced by valve assembly 22 rather than inserting a valve unit in the existing connection. Further, the end connections 36 and 38 (and particularly the latter) can take different forms depending on the nature of the existing connection in the propane system.

Turning now to the gauge assembly 14, this assembly includes a gauge 40 with a main connector 40a, an intermediate connector element 42, and a hose 44 with a first female flare union 46 at the end thereof proximate to gauge 40 and a second female flare union 48 at the opposite end thereof. Union 48 includes an actuator pin or member (not specifically shown) which provides actuation of valve stem 30a and thus opening of valve unit 30 when union 48 is screwed on the male flare connection 28a of tee connector 28.

The face of gauge 40 is shown in more detail in FIG. 3. Gauge 40 is a pressure gauge and in the illustrated embodiment, a measurement band or scale 50 provided around the outer periphery of the gauge indicates the measured gauge pressure in pounds per square inch, while an inner, concentric, part-circular measurement band or scale 52 provides an indication of the corresponding ambient temperature in degrees F. In the latter regard, the temperature scale 52 is calibrated to provide an indication of the minimum ambient temperature for the corresponding pressure reading so that, as shown, for a measurement of 40 psi gauge the temperature should be no higher than about 20° F. while for measurement of 50 psi gauge the temperature should not be higher than roughly about 52° F. These pressure-temperature relationships have been previously determined for propane tanks and by incorporating the relationships into gauge 40, a repairman, knowing the ambient temperature, is provided with a direct indication as to whether the tank 16 may be out of fluid. Thus, considering the position of the needle 54 of gauge 40 shown in FIG. 3, the ambient temperature corresponding to the pressure reading (of about 75 psi) is about 48° F. so that the actual ambient temperature is higher, the tank 18 is possibly out of liquid.

It is to be understood that the indication provide by gauge 40 essentially concerns the rate of vaporization of the liquid so that when the ambient temperature reading corresponding to the gauge pressure is lower than the actual ambient temperature, an indication is provided that the vaporization rate in the tank 16 is insufficient. It will be appreciated that there can be more than one cause for this so that the tank may not actually be empty. For example, the situation may be one wherein the liquid in the tank is being used at a very high rate when the pressure measurement is made or one where the tank is too small and a larger tank is thus required. In any event, the pressure measurement and the corresponding calibrated value of the ambient temperature as compared with the actual temperature alert the repairman to a possible problem, including the possibility that the tank is empty.

Considering the overall operation of the assembly 10 of FIGS. 1 to 3, to install the valve assembly 12, the repairman simply replaces the existing, typically flexible connection between tank valve 20 and regulator 24 with valve assembly 12. With the valve assembly in place, to make a pressure measurement, cap 32 is removed from tee section 28 and the end connector or hose 44 is screwed onto tee section 28 so as to actuate valve 30 and open a path to gauge 40. A reading is then taken to determine whether the tank is out of liquid. As discussed above, even if a pressure reading is obtained, the repairman will be alerted to the possibility that the tank is out of liquid if the corresponding calibrated ambient temperature reading on scale 52 is less than the actual ambient temperature. Assuming that some filling of the tank 16 is required, the tank is pressurized and the tank valve 20 is closed. At this point, gauge 40 is checked again to determine whether there is a leak. If gauge 40 provides a steady reading, there is no leak downstream thereof. On the other hand, if there is a significant fall in pressure and, in particular a fall in pressure within the limits of sections 54 and 58 of the NFPA Pamphlet referred to above, it can be safely assumed that there is a leak in the system or an open appliance valve. The gas supply valve should then be left off, the customer notified and repairs made, as required.

Although the use of the gauge shown in FIG. 1 is generally preferred because of the ease of reading thereof, such a gauge may not be necessary in locations such as the sub-tropics where the temperature remains substantially constant during the work day and thus a conventional pressure gauge would be suitable. Further, although this would be more cumbersome, a chart or table showing vapor pressure of propane, such as that set forth below, can be used in combination with a conventional pressure gauge to relate temperature and pressure.

TABLE 1

| VAPOR PRESSURES OF PROPANE | | | |
|---|---|---|---|
| 130° F. | 257 psig | 20° F. | 40 psig |
| 120° F. | 225 psig | 10° F. | 31 psig |
| 110° F. | 197 psig | 0° F. | 23 psig |
| 100° F. | 172 psig | −5° F. | 20 psig |
| 90° F. | 149 psig | −10° F. | 16 psig |
| 80° F. | 128 psig | −15° F. | 13 psig |
| 70° F. | 109 psig | −20° F. | 10 psig |
| 65° F. | 100 psig | −25° F. | 8 psig |
| 60° F. | 92 psig | −30° F. | 5 psig |
| 50° F. | 77 psig | −35° F. | 3 psig |
| 40° F. | 63 psig | −40° F. | 1 psig |
| 30° F. | 51 psig | −44° F. | 0 psig |

Figure 4:
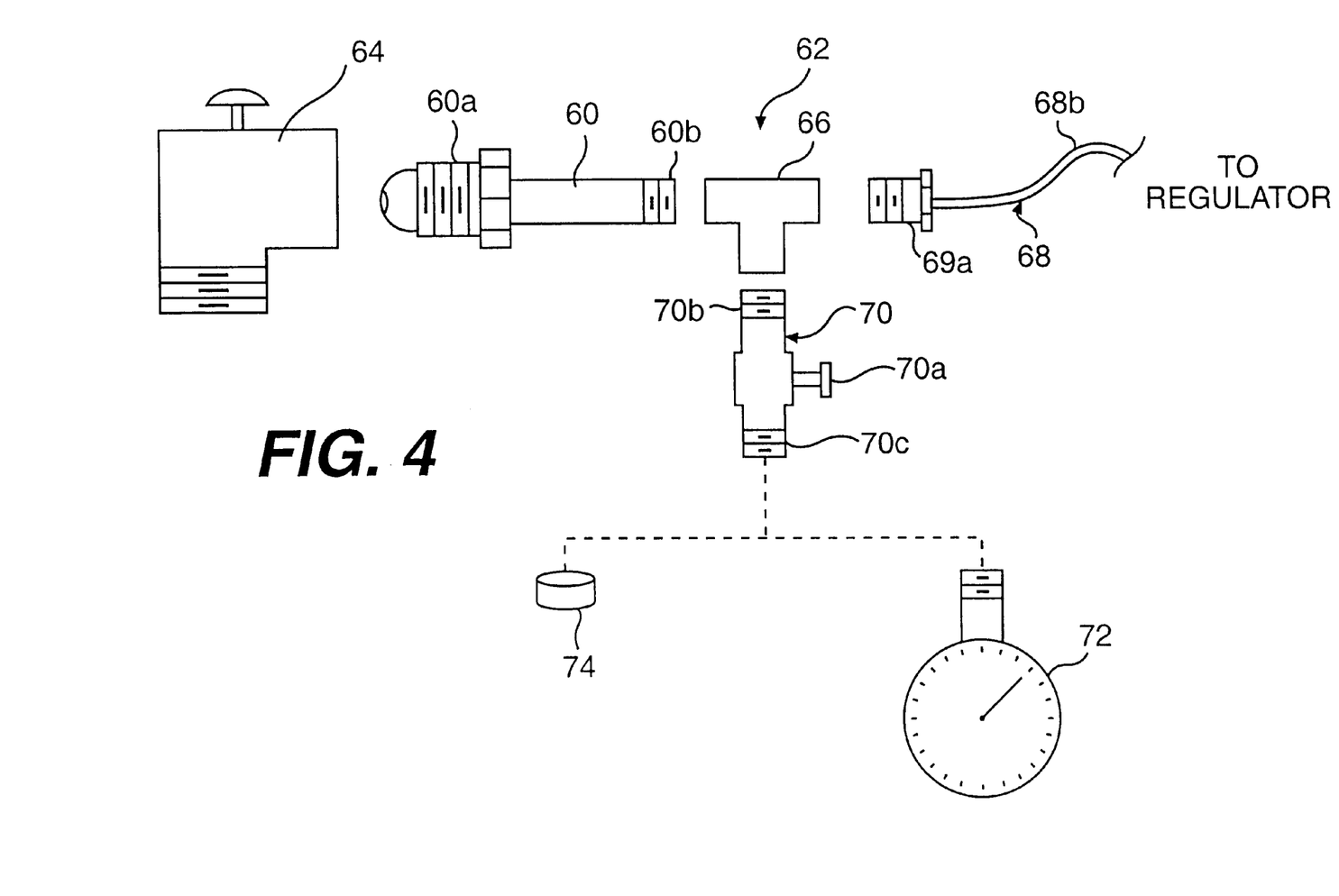
FIG. 4 is an exploded front elevational view of another embodiment of the kit of FIG. 1.

Referring to FIG. 4, a first alternative embodiment of the invention is shown. In this embodiment, a straight pipe brass connector 60 is used to connect the overall valve and connector assembly 62 to the a conventional tank valve, indicated at 64. Connector 60 includes conventional left-hand threading 60a for making this connection. The threading 60b at the other end of connector 60 is used to make a connection with the main body of a one piece female tee connector 66.

The other end of the main body of tee connector 66 is adapted to be connected to the threaded end 68a of a pigtail connector 68 which includes a pigtail portion 68a and which connects to the regulator (not shown in FIG. 4).

In this embodiment, a needle valve unit 70, including a valve control member 70a and male threads 70b and 70c at opposite ends thereof, is connected to the branch connector portion of tee connector 66. The valve control member 70 controls opening and closing of the associated valve of valve unit 70, i.e., this is not effected automatically as in the previous embodiment.

A pressure gauge 72 is screwed onto valve unit 70 when a pressure measurement is to be made whereas a cap 74 can be screwed onto valve unit 70 at other times. As set forth above, pressure gauge 72 can be a pressure gauge such as that shown in FIG. 3 or can be a conventional (e.g., 300 psig) pressure gauge for use with a chart or table which corresponds to Table 1 above relating temperature and vapor pressure and which would be adapted to be carried by the service personnel.

Figure 5:
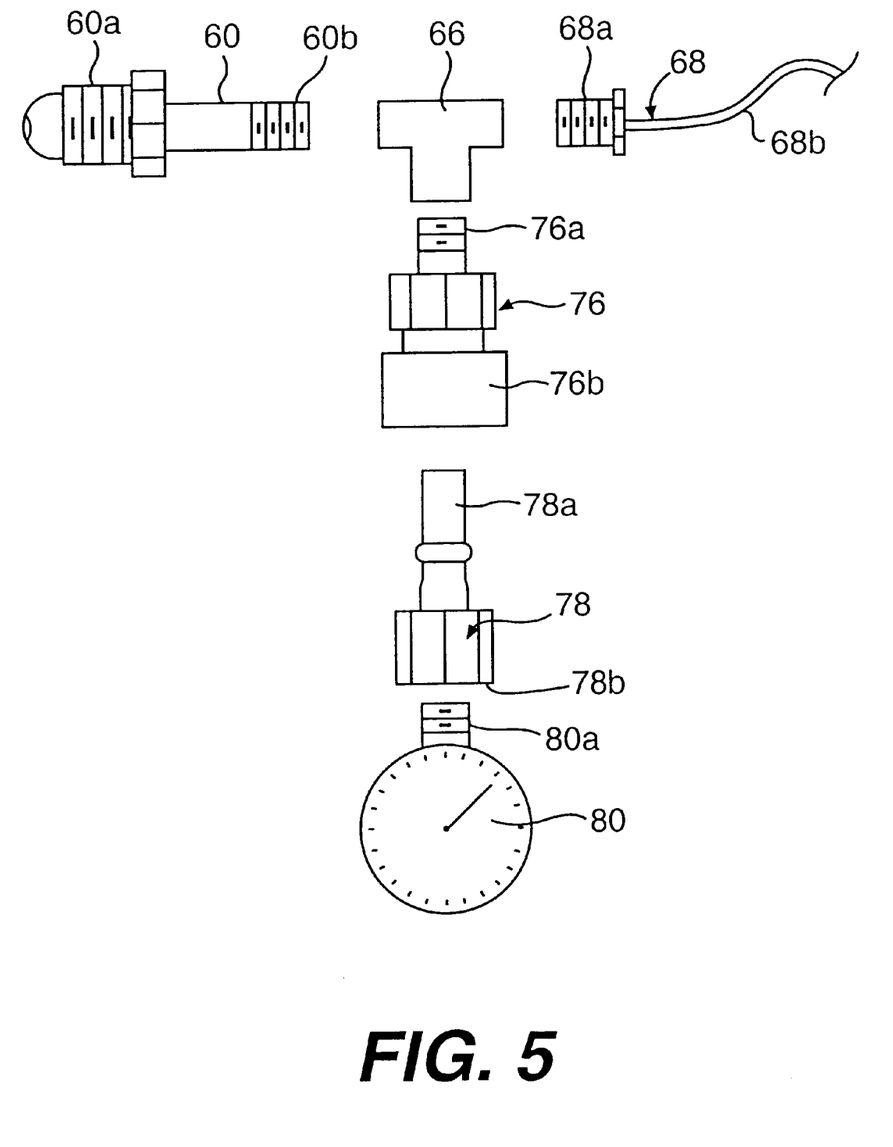
FIG. 5 is an exploded front elevational view of yet another embodiment of the kit of FIG. 1.

Referring to FIG. 5, a further embodiment of the invention is shown. This embodiment uses a number of components in common with the embodiment of FIG. 4 and these components, viz., the straight pipe connector 60, the tee connector 66 and the pigtail connector 68, have been given the same reference numerals. This embodiment differs from that of FIG. 4 in that the tee section also includes a female, liquid petroleum approved, quick coupling valve unit 76 which is adapted to be screwed by means of threading 76a onto the branch connection portion of tee connector 66. Valve unit 76 is essentially conventional and includes an associated valve (not shown in FIG. 5) which is actuated when a male connector element 78a of a conventional male quick coupling unit 78 is inserted into the female receptacle 76a of coupling unit 76. Screw threadings 78b enable male unit 78 to be connected to complementary threadings 80a of a pressure gauge 80 which, again, can be the gauge of FIG.

3 or a more conventional gauge. Thus, a gauge reading can be provided by coupling male unit 78 with the associated gauge 80 screwed thereon, to the female valve unit 76 in the general manner of the embodiment of FIG. 1.

Figure 6:
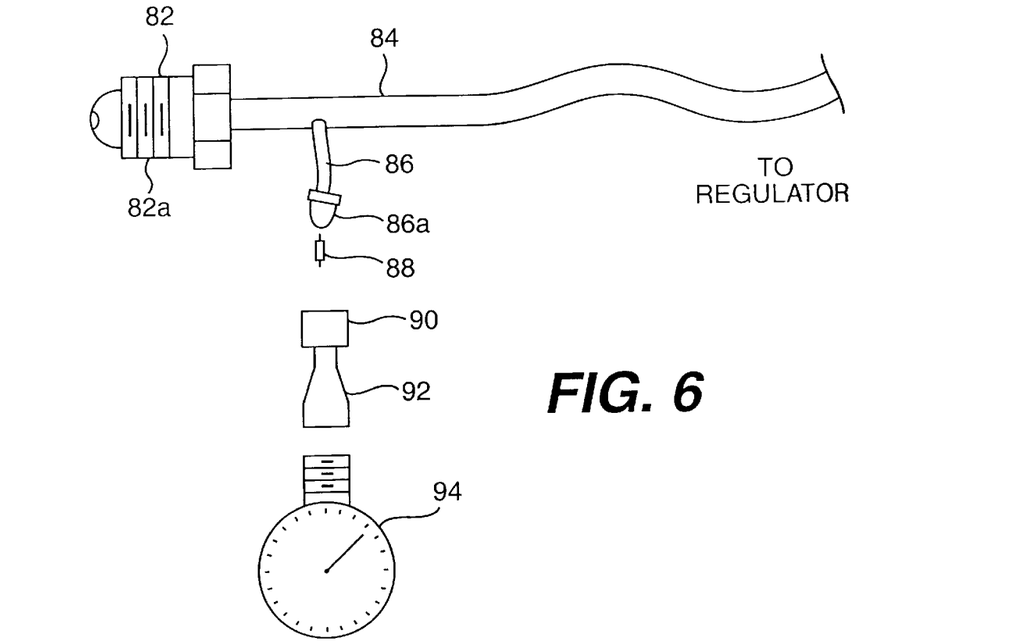
FIG. 6 is an exploded front elevational view of a further embodiment of the kit of FIG. 1.

Turning to FIG. 6, yet another embodiment of the invention is shown. In this embodiment, the connector portion of the valve and connector assembly comprises connector element 82, which is similar to the connector element of the straight pipe connectors 60 of FIGS. 4 and 5 and which includes corresponding threading 82a for connection to the tank valve (not shown in FIG. 6), and a pigtail connector 84, which is connected at its free end to the regulator (not shown). Further, instead of providing a separate tee connector as such, a tee or branch connection is provided by welding a Schrader valve unit 86 to the pigtail connector section 84. The core of the Schrader valve of unit 86 is indicated at 88 and valve unit 88 includes a conventional free end connector 88a adapted to be received in a swivel nut 90 with a depressing stem (not shown) for actuating the Schrader valve. A flange adapter 92, affixed to swivel nut 90, enables connection to a gauge 94 which, again, can be either of the two basic types discussed above.

Figure 7:
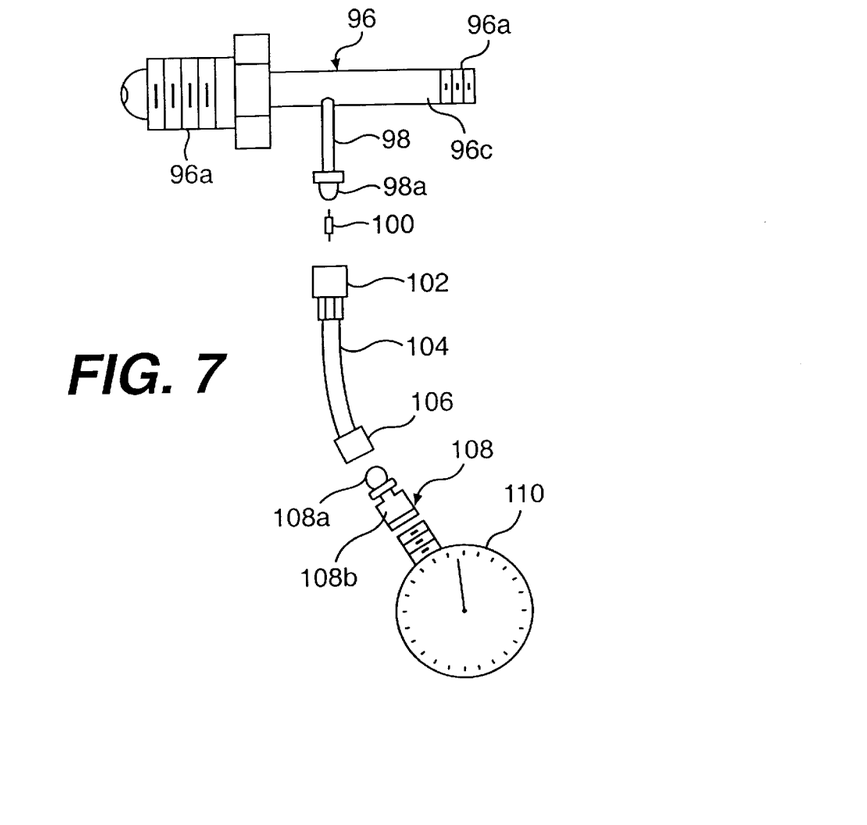
FIG. 7 is an exploded front elevational view of still another embodiment of the kit of FIG. 1.

Referring to FIG. 7, still another embodiment of the invention is shown. This embodiment differs from those discussed above in that a direct hookup or connection to the regulator is provided and is particularly useful with systems employing liquid petroleum cylinders or bottles. A brass straight pipe connector 96 with conventional left-handed threading 96a for connection to the tank valve (not shown in FIG. 7) also includes suitable threading 96b at the other end of the straight pipe section 96c of connector 96 for providing the direct connection to the cylinder regulator (not shown). Similarly to the embodiment of FIG. 6, a Schrader valve unit 98 is welded to the straight pipe section 96c and includes a valve core 100, and a swivel nut 102 for actuating the Schrader valve is also provided. A flexible hose 104 connects nut 102 to a second female swivel nut 106 which differs from swivel nut 102 in that nut 106 does not include an actuating stem. A further connector 108, including a male flare 108a and a female adapter 108b, is used to connect hose 106 to a suitable gauge 110.

Figure 8:
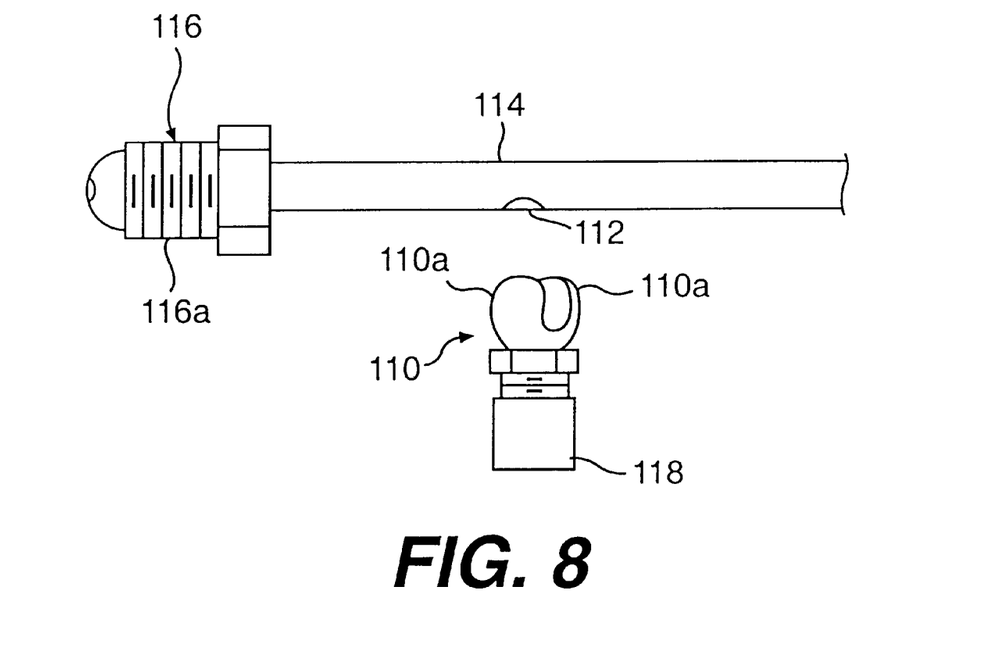
FIG. 8 is an exploded front elevational view of yet another embodiment of a part of the kit of FIG. 1.
Figure 9:
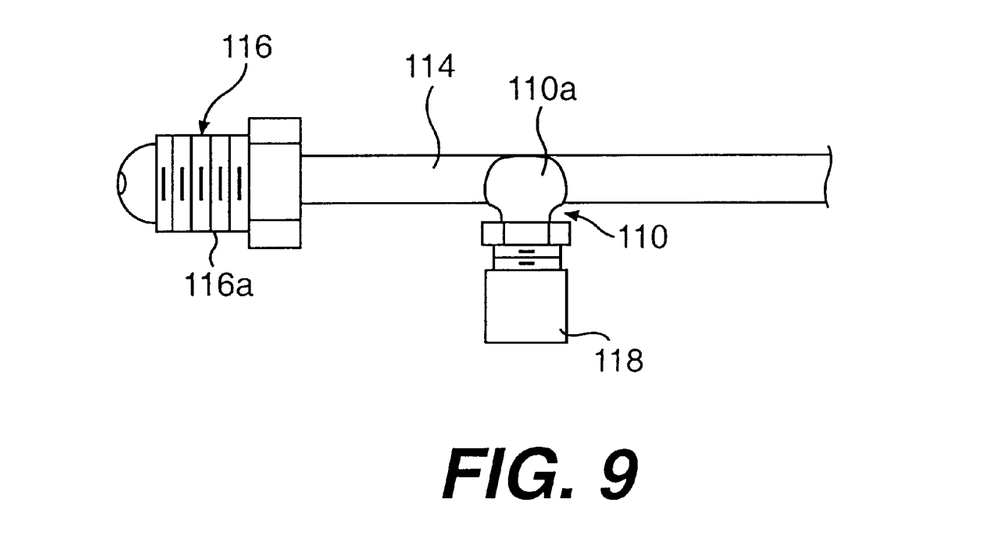
FIG. 9 is a front elevational view of the embodiment of FIG. 8, as assembled.

Referring to FIGS. 8 and 9, there is shown yet another embodiment of the invention. This embodiment is similar to that of FIGS. 6 and 7 in that a valve connection is again made directly to the pipe connection to the tank valve (rather than using a tee connector), but in this embodiment a "saddle" valve unit, indicated at 110, is used to make the direct connection. As shown in FIG. 8, a hole 112 is provided, e.g., by drilling, in a pipe connector 114. The latter may be a straight connector or a pigtail connector and includes an end connector 116 with conventional left hand threading 116a. In a specific exemplary implementation, connector 114 is either ¼" or ⅜" by 12" copper pigtail tube.

The legs 110a of saddle valve unit 110, which are skewed in FIG. 8 for purposes of illustration, fit around connector 114 and the saddle valve unit 110 is soldered or welded directly onto connector 114 over the drilled hole 112. A knurled end cap or valve cap 118, generally corresponding to end cap 32, is connected to the free end of valve unit 110.

An advantage of the embodiment of FIGS. 8 and 9 over those of FIGS. 6 and 7 is that a stronger connection is provided between the valve assembly and the connector piping. Valve unit 110 preferably incorporates a Schrader valve but can employ another type of valve as discussed above. It will be understood that a meter would also be part of the overall kit or assembly and would, in use, be connected to the valve 110 after the cap 118 was removed, as described above in connection with the other embodiments.

Although the present invention has been described to specific exemplary embodiments thereof, it will be understood by those skilled in the art that variations and modifications can be effected in these exemplary embodiments without departing from the scope and spirit of the invention.

What is claimed is:

1. A method for use by propane tank service personnel in detecting escaping gas in a propane tank system including a regulator and a tank service valve connected together by a valve and connector assembly including first and second end connections connected to the tank service valve and the regulator, respectively, a branch connection portion, and a valve unit disposed in said branch connection portion and including a valve stem actuable to open said valve unit, said method comprising using a separate pressure gauge assembly individually assigned to tank service personnel and adapted to be carried by said personnel for testing the pressure in the propane tank, said pressure gauge assembly including a pressure gauge; a valve assembly connector including means for actuating the valve unit when the valve assembly connector is connected to the valve assembly, said testing of pressure comprising connecting the valve assembly connector of the pressure gauge assembly to the branch connection portion of the valve and connector assembly to actuate the valve unit and thus provide an immediate reading of the tank pressure by said gauge, using the reading of tank pressure in determining whether the tank is out of propane gas, and thereafter taking one or the other of the following two steps depending on the determining step: if the tank is determined to not be out of propane gas, introducing gas into the tank as needed; and if the tank is determined to be out of propane gas, turning the tank service valve off, pressurizing the tank, turning the service valve on, introducing gas into the system to pressurize the system, thereafter turning the tank service valve back off again so as to isolate the gas introduced into the tank, and reading the gauge pressure to determine whether gas is escaping from the propane tank system.

2. A method as claimed in claim 1 wherein said valve and connector assembly includes a main connection portion between said first and second end connections and an outlet hole is drilled into said main connector portion at an intermediate location therealong and said valve unit comprises a saddle valve affixed to said main connector portion over said outlet hole.

3. A kit for use in a propane tank system for enabling detection of escaping gas by tank repair personnel, the tank system including a standard connector connecting a regulator to a tank service valve, and said kit comprising:

a valve and connector assembly for connection between the regulator and the service valve in place of the standard connector, said valve and connector assembly comprising a connector including end connections for connection to the regulator and the service valve, respectively, a main connector portion between said end connectors and including an outlet hole therein, and a branch connector portion connected at one end thereof to said main connector portion and terminating in a free end, said branch connector portion comprising a saddle valve unit directly connected to said main connector portion over said outlet hole and including a valve stem actuable to open a connection from said connector to the free end of said branch connector portion, and a separate pressure gauge assembly adapted to be carried by tank repair personnel and including a pressure gauge, and mounting means, affixed to said pressure gauge, for providing connection of said pressure gauge to said free end of the branch connector portion of said valve assembly, and for, when connected to said free end of said branch connector portion, providing actuation of said valve stem so that, in use with the tank service valve open, the gauge provides a reading of the tank pressure and, in use with the system pressurized and the tank service valve closed, the gauge provides an indication of the presence of a leak or open line in the propane tank system.

4. A kit as claimed in claim 1 wherein said saddle valve unit includes outwardly extending spaced legs which fit around the main connector portion and are welded or soldered to said main connector portion.

5. A kit as claimed in claim 1, wherein said main connector portion includes at least one flexible portion.

6. A kit as claimed in claim 5, wherein said at least one flexible portion comprises a pigtail section.

7. A kit as claimed in claim 1, wherein said saddle valve unit is welded or soldered to said main portion.

8. A kit as claimed in claim 1, wherein said main connector portion includes a pigtail section and said branch connector portion is welded or soldered to said pigtail section.

9. A kit as claimed in claim 1, wherein said gauge comprises an indicating needle and further includes a pressure scale and an ambient temperature scale calibrated relative to said pressure scale so that the position of said needle that provides a reading of gauge pressure on said pressure scale also provides a reading of the corresponding minimum ambient temperature on said ambient temperature scale.

10. A kit as claimed in claim 1, wherein said connector includes a straight pipe connector and one of said end connectors comprises left-hand threading on said straight pipe connector for connection to the service valve.

11. A kit as claimed in claim 1, wherein said gauge comprises an indicating needle and further includes a pressure scale and an ambient temperature scale calibrated relative to said pressure scale so that the position of said needle that provides a reading of gauge pressure on said pressure scale also provides a reading of the corresponding minimum ambient temperature on said ambient temperature scale.

12. A kit as claimed in claim 1, wherein said valve unit comprises a Schrader valve.

13. A kit as claimed in claim 1, wherein said pressure gauge assembly includes a connecting hose connected to said pressure gauge and s aid mounting means is disposed at the other end of said hose and includes a finger pressure operated screw-on connector.

14. A kit as claimed in claim 1, wherein said valve unit comprises a Schrader valve.

15. A kit as claimed in claim 1, wherein said gauge comprises an indicating needle and further includes a pressure scale and an ambient temperature scale calibrated relative to said pressure scale so that the position of said needle that provides a reading of gauge pressure on said pressure scale also provides a reading of the corresponding minimum ambient temperature on said ambient temperature scale.

16. A kit for use in a propane tank system for enabling detection of escaping gas by tank repair personnel, the tank system including a standard connector connecting a regulator to a tank service valve, and said kit comprising:

a valve assembly and connector assembly for connection between the regulator and the service valve in place of the standard connector, said valve and connector assembly comprising a connector including end connections for connection to the regulator and the service valve, respectively, a main connector portion between said end connectors and including a drilled outlet hole therein, and a branch connector portion connected at one end thereof to said main connector portion and terminating in a free end, said branch connector portion comprising a saddle valve unit directly connected to said main connector portion over said outlet hole including outwardly extending spaced legs affixed to said main connection portion on opposite sides thereof and including a manually operated valve control member actuable to open a connection from said connector to the free end of said branch connector portion, and a separate pressure gauge assembly adapted to be carried by tank repair personnel and including a pressure gauge, and a mounting means, affixed to said pressure gauge, for providing connection of said pressure gauge to said free end of the branch connector portion of said valve assembly, so that, in use with said valve unit open and with the tank service valve open, the gauge provides a reading of the tank pressure and, in use with the system pressurized and with the valve unit open and with the tank service valve closed, the gauge indicates the presence of a leak or open line in the propane tank system.

* * * * *